Feb. 21, 1956  R. G. PIETY  2,735,295
APPARATUS FOR TESTING RUBBER
Filed Dec. 18, 1951  2 Sheets-Sheet 2
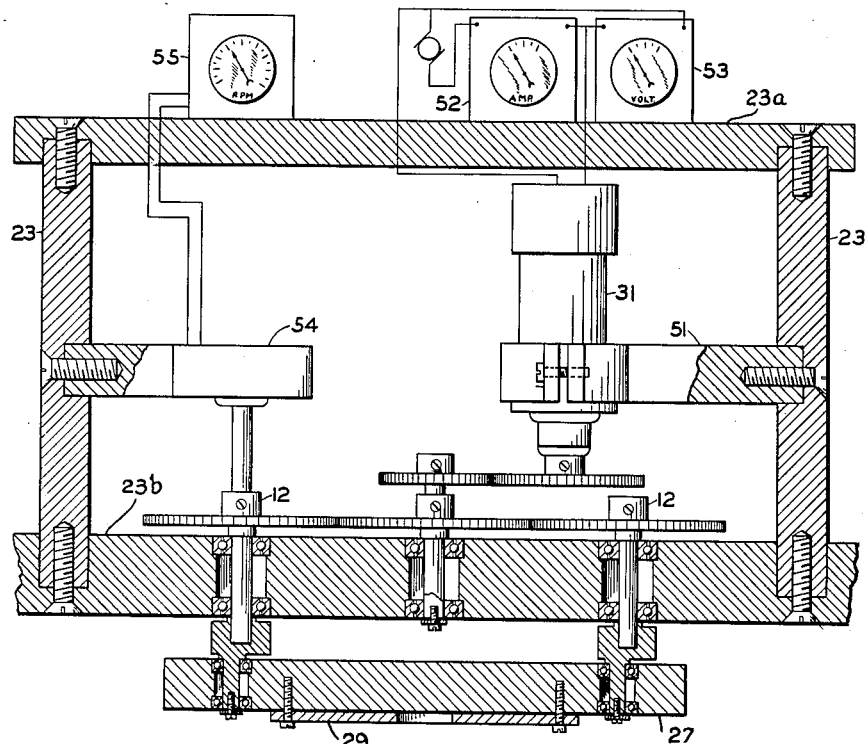
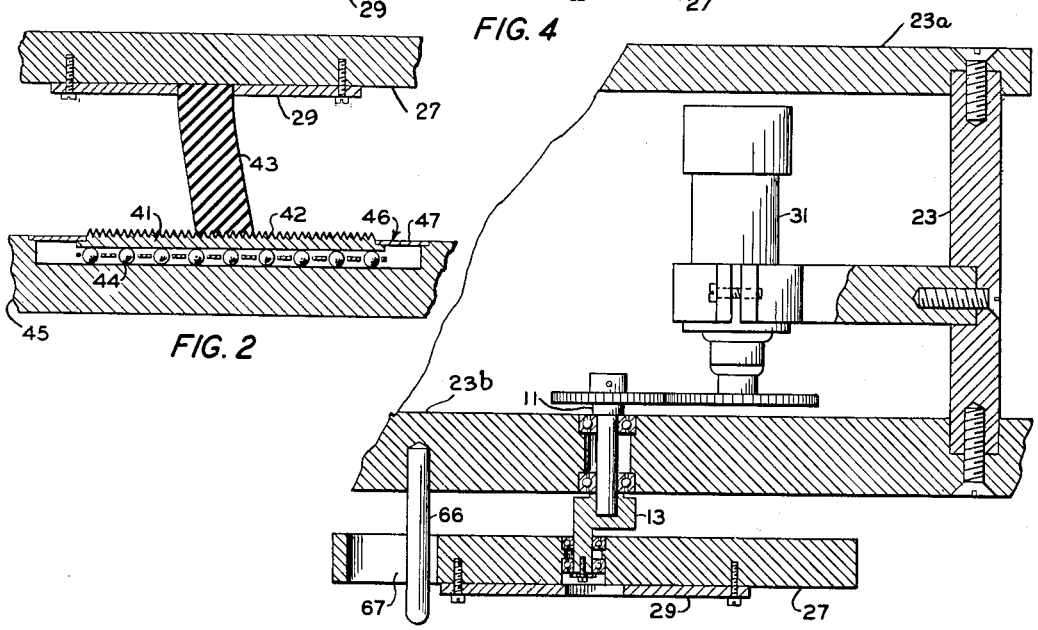
INVENTOR.
R G. PIETY
BY Hudson & Young
ATTORNEYS.

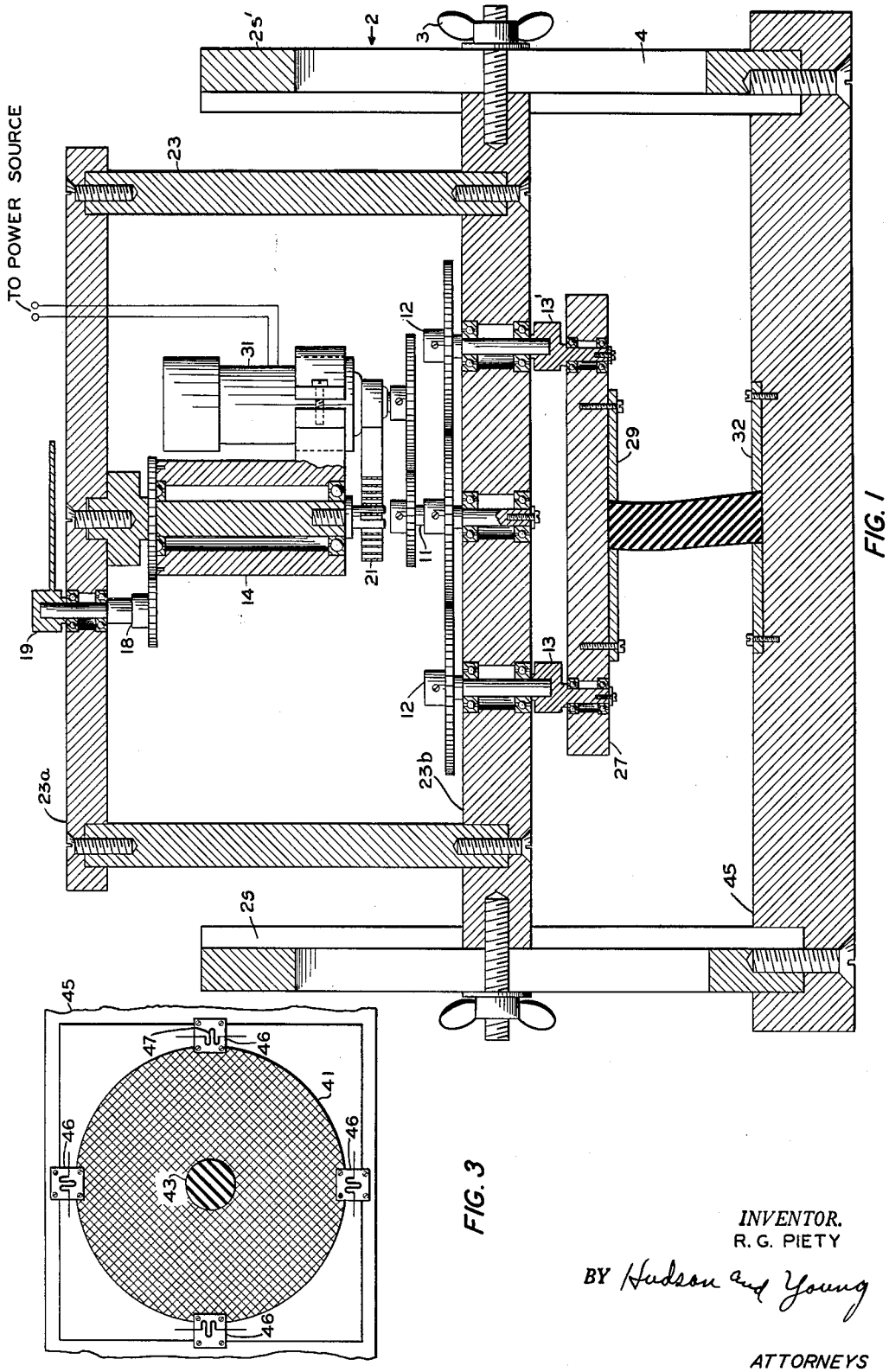

United States Patent Office 2,735,295
Patented Feb. 21, 1956

2,735,295
APPARATUS FOR TESTING RUBBER

Raymond G. Piety, Bartlesville, Okla., assignor to Phillips Petroleum Company, a corporation of Delaware Application December 18, 1951, Serial No. 262,307

8 Claims. (Cl. 73—100)

This invention relates to rubber testing. In one of its more specific aspects it relates to an apparatus for conducting a quick and simple determination of the hysteresis of a sample of rubber. In another of its more specific aspects it relates to an apparatus for determining the stress and strain characteristics of a sample of rubber.

The development of the synthetic rubber industry coupled with the increased use of rubber has emphasized the need for a rapid and simple method of determining the characteristics of the various rubber compounds designed for different end uses. There are a number of methods and apparatus available for evaluating rubber stocks, however they are either time-consuming or complicated and cumbersome to operate or both.

In at least one modification of this invention, at least one of the following objects is attained.

It is an object of this invention to provide apparatus for determining the rotational hysteresis characteristics of a rubber stock. It is another object to provide an apparatus for determining the shear stress and strain relationship of a rubber stock. It is still another object to provide a quick and simple means for testing rubber. Other objects will be apparent to one skilled in the art upon reading the disclosure.

In further describing my invention, reference will be made to the accompanying diagrammatic drawing wherein:

Figure 1 is an elevation of one embodiment of an apparatus of my invention.

Figure 2 is a modification of the lower sample holding block and plate.

Figure 3 is a plan view of the plate of Figure 2.

Figure 4 is a modification of the apparatus of Figure 1 wherein the motor is secured from revolving about a central drum.

Figure 5 is a modification wherein only one crank is employed to operate the upper sample holding block.

Referring now to Figure 1, the frame 23 is secured to vertical side members 2s and 2s' of frame 2 by wing-bolts 3 and is vertically adjustable within frame 2 by means of the wing-bolts 3 which extend through slots 4.

Motor 31 is secured to drum 14 which is free to rotate about its axis. The axle of drum 14 is rigidly secured to the top member 23a of frame 23. The housing of motor 31 is secured to a coil spring 21 connected to the lower end of the axle bearing of drum 14 so that motor 31 revolves about the axis of drum 14 against the torque of the coil spring 21. The drive shaft of motor 31 is connected by the gear train 11, 12 to cranks 13 and 13' which project through the horizontal bottom of 23b of frame 23. Cranks 13 and 13' are rotatably secured to block 27 so that rotation of cranks 13 and 13' produces an orbital motion of block 27 in a plane parallel to the bottom of frame 2. Upper sample holding plate 29 is secured to the bottom of block 27 and lower sample holding plate 32 is secured to the upper side of the bottom 45 of frame 2 so that when a sample is secured in place the sample will be radially displaced by an amount equal to the length of the arms of cranks 13 and 13'. Pointer 19 is connected by gear assembly 18 to drum 14 so that the torque produced by motor 31 is indicated by pointer 19.

According to the practice of the present invention, a rubber sample is placed in the recesses of the blocks 29 and 32 as shown in Figure 1 of the accompanying drawing. It will be noted that the recess in block 29 is displaced to the right by approximately ¼ inch (¼ inch off center). The amount of displacement is determined by the length of the arms of cranks 13 and 13'. Block 29 is securely attached to mount 27 and the two are rotated by means of cranks 13 and 13' held in place in framepiece 23. Cranks 13 and 13' are rotated by motor 31 through gear shafts 11 and 12.

Motor 31 is mounted on drum 14 which is free to rotate on a central shaft. The motor and mount can move about the central shaft within the torque limits which oppose coil spring 21. Thus, when power is supplied to the motor the torque exerted will tend to wind up spring 21 until the motor torque equals the opposing spring torque. A gear attached to shaft 18 and pointer assembly 19 will indicate the position of motor 31, or in other words, the torque produced by the motor.

It will be apparent that once current is supplied to motor 31, it will operate to rotate a stress already produced in the sample, at a controlled rate which remains constant in magnitude.

In operation the motor can be operated at a given speed with no rubber sample between the blocks and a voltage-current reading taken. The pointer assembly 19 will give a no load zero reading with the motor running.

The sample is then placed between the blocks and one end displaced a small amount radially to introduce a radial strain along the axis of the sample. The stress necessary to produce the strain can be measured by means of strain gages. The motor is rotated at a same given speed and a new voltage-current reading taken. It will be obvious that the pointer assembly 19 will give a new reading. The difference between the two readings of the pointer assembly will afford an indication of the torque required to rotate the sample under the strained conditions. The difference between the two voltage-current readings at the same speeds will afford a measure of the power required or work necessary to rotate the sample under a certain constant uniform stress. The work measurement affords a measure of what may be called the rotational hysteresis.

Figure 2 shows a modification of this invention wherein the lower block is mounted on roller bearings and attached to strain gages. Thus, referring to Figure 2 the bottom plate on block 41, having a roughened surface 42 for preventing slippage of the sample 43, rests upon the ball-race 44. Plate 41 is prevented from lateral or rotational movement by being secured to frame 45 by four thin metal pieces 46 spaced equidistant from each other. Upon each connecting piece 46 is secured a strain gage 47. Thus, when a sample of rubber is secured between the top and bottom plates of the apparatus and one end is displaced radially the stress produced in the sample is transmitted to the strain gages and is recorded upon conventional instruments (not shown). Similarly when one end of the sample is rotated in an orbital path so that the shear produced is rotated from one position to another the tendency of the lower plate to be rotated is transmitted by the strain gages to the instruments and from these records the characteristics of the rubber stock can be calculated.

The modification shown in Figure 2 can be combined with the apparatus of Figure 1 so that torque of the driving motor in addition to the strain gages are employed to measure the characteristics of the rubber stock being examined.

Figure 4 shows a modification of this invention wherein the motor 31 is secured to framepiece 23 by the bar 51 instead of rotating about drum 14. In this modification the coil spring 21 and the pointer assembly 18 and 19 of the apparatus of Figure 1 are not employed.

The motor 31 employed in each modification of this invention is a constant speed, constant torque, D. C. motor. Thus, the amount of work exerted in rotating the stress, in the sample being tested from one position to another is determined by the ammeter 52 and the voltmeter 53 connected to motor 31 and the recorded values are employed to determine the characteristics of the rubber stock.

R. P. M. counter 54 is rotatably connected to one of the two gear wheels 12 and is secured to frame 23 so as to provide a means for determining whether the upper plate is being rotated in an orbital movement at a constant speed. The R. P. M. are recorded on meter 55. The R. P. M. counter 54 can be a generator in which case instrument 55 converts the voltage or current generated into R. P. M. The voltmeter, ammeter and R. P. M. counter can be indicating, or recording instruments or both.

Figure 5 is a schematic elevation of a modification wherein only one crank is employed to operate the upper sample holding plate. The crank 13 is operated by motor 31 through gear train 11. Rotation of block 27 and plate 29 is prevented by post 66 operating in slot 67. Determination of the characteristics of the material tested can be by any of the methods previously described.

The apparatus of this invention is adapted for testing rubber, metal, plastics, and other solid materials. The sample retaining plates of the apparatus of the invention can be placed close together so that liquid and semi-liquid materials can be tested for viscosity.

Variations and modifications are possible within the scope of the disclosure of the present invention the essence of which is that the characteristics of a rubber stock can be evaluated by radially displacing one end of a sample of the rubber, determining the resulting shear and then determining the amount of work required to rotate this constant shear strain from one position to another.

I claim:

1. An apparatus for testing a sample of pliable material which comprises a first sample holding means for securing one side of said sample motionless; a second sample holding means spaced from said first sample holding means for securing and displacing the opposite side of said sample a predetermined distance radially from its axis extending between said first and second sample holding means so as to develop a constant shear in said sample; means for moving said second sample holding means along the perimeter of a circle, which is normal to the said axis of said sample, and which has a radius equal to the displacement developed in said sample; and means for measuring work done on said sample.

2. An apparatus for testing a cylindrical sample of pliable material which comprises means for securing a first end of said sample motionless; means spaced from said first named means for securing and displacing the second end of said sample a predetermined distance radially from its longitudinal axis so as to develop a constant shear in said sample; means for moving the displaced end of the sample along the perimeter of a circle, which is normal to the longitudinal axis of the sample, and which has a radius equal to the displacement developed in said sample; and means for measuring the work required to rotate the constant shear developed in said sample from one position to another.

3. An apparatus for testing a cylindrical sample of pliable material which comprises means for securing a first end of said sample motionless; means spaced from said first named means for securing and displacing the second end of said sample a predetermined distance radially from its longitudinal axis so as to develop a constant shear in said sample; means for measuring said shear; means for moving the second end of said sample along the perimeter of a circle, which has a radius equal to the displacement developed in said sample, and which is normal to the longitudinal axis of said sample; and means for measuring the work required to rotate the constant shear developed in said sample from one position to another.

4. An apparatus for testing a cylindrical sample of pliable material which comprises a first sample holding member adapted so as to hold one end of said sample motionless; a second sample holding member, spaced from and parallel to said first sample holding member, said second sample holding member positioned so as to displace the other end of the sample a predetermined distance radially from its longitudinal axis; means for measuring the shear developed in said sample; at least one crank operatively connected to said second sample holder and adapted so as to impart an orbital motion to said second sample holder with respect to the longitudinal axis of said sample; a power source adapted so as to drive said crank; and means for measuring the resistance of said sample to said orbital motion.

5. An apparatus for testing a cylindrical sample of pliable material which comprises a first sample holding member adapted so as to hold a first end of said sample motionless; a second sample holding member, spaced from and parallel to said first member, said second member positioned so as to displace the second end of the sample a predetermined distance radially from its longitudinal axis; at least one crank operatively connected to said second member and adapted so as to impart an orbital, non-rotating motion to said second member with respect to the longitudinal axis of said sample; a power source adapted so as to drive said crank; and means for measuring the resistance of said sample to said orbital motion.

6. An apparatus for testing a cylindrical sample of pliable material which comprises a first supporting frame comprising a horizontal bottom member and vertical side members; a first sample holding member secured to the upper face of the bottom member of said first frame and adapted to secure one end of said sample from movement; a second supporting frame comprising horizontal top and bottom members and vertical side members and adapted so as to be secured to said first frame so that the bottom of said second frame is parallel to and spaced from the bottom of said first frame; an axle member rigidly secured to the top member of said second frame; a rotatable member secured to said axle member; a motor secured to said rotatable member; a coil spring connected to said motor and to the axle of said rotatable member so as to provide a predetermined resistance to rotation of said motor around said axle; crank means positioned on the lower face of the bottom member of said second frame and having shafts which project through said bottom member; gear means operatively connecting said motor to said cranks; a second sample holding means operatively connected to said cranks and adapted so as to displace one end of said sample from its longitudinal axis an amount equal to the length of said cranks; said cranks adapted so as to impart an orbital motion to said second sample holder with respect to said sample; and indicating means operatively connected to said rotatable means so as to indicate the torque produced by said motor.

7. An apparatus for testing a cylindrical sample of pliable material which comprises a first supporting frame comprising a horizontal bottom member and vertical side members; a first sample holding member secured to the upper face of the bottom member of said first frame and adapted so as to secure one end of said sample from movement; a second supporting frame comprising horizontal top and bottom members and vertical members and adapted so as to be secured to said first frame so that the bottom of said second frame is parallel to and spaced from the bottom of said first frame; a motor secured to said second frame; crank members positioned on the bottom of said second frame; gear means operatively connecting said motor and said cranks; a second sample holding means operatively connected to said cranks and adapted so as to displace one end of said sample from its longitudinal axis an amount equal to the length of said cranks so that the second sample holder follows an orbital path about said longitudinal axis of said sample when said cranks are operated; and means for measuring electrical energy supplied to said motor.

8. The apparatus of claim 6 wherein said first sample holding member comprises a block; means for securing one end of said sample to said block; a plurality of support members securing said block to the bottom member of said first frame; strain gages operatively connected to said support members; and amplifying and recording means operatively connected to said strain gages.

References Cited in the file of this patent

UNITED STATES PATENTS

| | | |
|---|---|---|
| 1,512,063 | Sproull | Oct. 21, 1924 |
| 1,581,215 | Kobin | Apr. 20, 1926 |
| 2,318,506 | Lovell | May 4, 1943 |
| 2,608,858 | Granberry | Sept. 2, 1952 |
| 2,624,197 | Goodhue et al. | Jan. 6, 1953 |

FOREIGN PATENTS

| | | |
|---|---|---|
| 530,418 | Great Britain | Dec. 11, 1940 |
| 682,922 | Great Britain | Nov. 19, 1952 |